(12) United States Patent
Boor et al.

(10) Patent No.: US 10,003,112 B1
(45) Date of Patent: Jun. 19, 2018

(54) BATTERY BACKPLANE ASSEMBLY WITH INTEGRATED BUS BAR CONNECTIONS AND THERMAL MANAGEMENT FEATURES

(71) Applicant: GM Global Technology Operations LLC, Detroit, MI (US)

(72) Inventors: Paul J. Boor, Macomb, MI (US); Robert J. Heydel, Clawson, MI (US); Robert J. Schoenherr, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/829,117

(22) Filed: Dec. 1, 2017

(51) Int. Cl.
*B60R 16/04* (2006.01)
*H01M 10/6556* (2014.01)
*H01M 10/6554* (2014.01)
*H01M 2/20* (2006.01)
*B60L 11/18* (2006.01)
*H01M 10/625* (2014.01)

(52) U.S. Cl.
CPC ....... *H01M 10/6556* (2015.04); *B60L 11/187* (2013.01); *B60L 11/1877* (2013.01); *B60L 11/1879* (2013.01); *H01M 2/206* (2013.01); *H01M 10/625* (2015.04); *H01M 10/6554* (2015.04); *H01M 2220/20* (2013.01)

(58) Field of Classification Search
CPC .......... B60R 16/00; B60R 16/04; H01M 2/02; H01M 10/60
See application file for complete search history.

(56) References Cited

U.S. PATENT DOCUMENTS

| 7,074,517 | B2 * | 7/2006 | Higashino | ......... H01M 10/0413 429/156 |
| 9,276,420 | B2 * | 3/2016 | Sun | ........................ H02J 7/0029 |
| 2013/0183555 | A1 * | 7/2013 | Boddakayala | ...... H01M 2/1077 429/72 |
| 2015/0180096 | A1 * | 6/2015 | Schwab | .................. F28F 21/08 429/120 |

* cited by examiner

*Primary Examiner* — John D Walters
*Assistant Examiner* — James J Triggs
(74) *Attorney, Agent, or Firm* — Quinn IP Law

(57) ABSTRACT

A battery pack for use with a supply of heat transfer fluid includes a plurality of battery modules arranged in one or more rows, and an elongated backplane positioned between the rows or adjacent to one row. The backplane has external longitudinal surfaces, and includes multiple bus bar assemblies equal in number to the number of battery modules and connected to the external longitudinal surfaces. The elongated backplane defines internal conduits configured to receive heat transfer fluid from the supply and extending along a length of the backplane adjacent to the bus bar assemblies. End plates of the battery modules include negative and positive voltage terminals mating with corresponding electrical connectors of a respective one of the bus bar assemblies. An electrical connection between each bus bar assembly and corresponding voltage terminals is established via a push-to-connect operation, with a finger-proof barrier covering the positive terminal.

19 Claims, 4 Drawing Sheets

BATTERY BACKPLANE ASSEMBLY WITH INTEGRATED BUS BAR CONNECTIONS AND THERMAL MANAGEMENT FEATURES

INTRODUCTION

A battery pack having a power capability suitable for energizing one or more electric traction motors or generators typically includes multiple battery modules each containing an arrangement of electrochemical battery cells. In some battery cell configurations, relatively thin cathode and anode plates are enclosed within a foil pouch containing an electrolyte fluid, with positive and negative electrodes or cell terminals extending from opposite ends of the foil pouch. The individual cell terminals are electrically connected in a given one of the battery modules, e.g., via an ultrasonic welding technique. The battery pack is then assembled by electrically connecting an application-specific number of battery modules together via a voltage bus having positive and negative bus bars. For example, multiple battery modules may be arranged on a flat battery tray and serially connected, after which an outer cover is secured to the battery tray to protect the battery modules.

Battery packs, particularly of the high-voltage type described above, generate substantial amounts of heat during sustained operation. Over time, the generated heat degrades the efficiency and overall structural integrity of the battery pack. Thermal management systems are therefore used to closely regulate the temperature of the battery pack. In a common type of thermal management system, heat transfer fluid is circulated to and from fins interspaced between the battery cells. The battery modules may also be directly heated or cooled via contact with a conductive plate, with such a plate similarly supplied with the heat transfer fluid. Fans, valves, chillers, radiators, and other components are controlled in a thermal management circuit to ensure that the battery pack remains at a desirable temperature.

SUMMARY

A battery pack is disclosed herein for use with an external supply of heat transfer fluid, with the battery pack having a backplane assembly that combines bus bar electrical connections, i.e., connection points at which the backplane connects to the positive and negative terminals of the battery modules making up the battery pack, with thermal regulation structure that directly cools or heats an area in proximity to such connection points. Use of the improved backplane assembly described below is intended to provide a simple "push-to-connect" backplane-to-battery module electrical interface that is characterized by an absence of threaded fasteners, rivets, or other joining structure requiring an operator to access the high-voltage bus. In this manner, the interface is rendered substantially "finger-proof" during all manners of assembly and service. Additionally, the integrated heat transfer structure of the backplane assembly may reduce overall bus bar size, with less bus bar surface area being required for heat radiation.

In a non-limiting example embodiment, a battery pack for use with a supply of heat transfer fluid includes a plurality of battery modules and a backplane assembly. The battery modules are arranged in one or more parallel rows, with each battery module having a pair of voltage terminals. The backplane assembly, shown as being positioned next to parallel rows but also usable with a single row of battery modules, includes an elongated backplane body and a plurality of bus bar assemblies. The backplane body has external longitudinal surfaces, and defines a plurality of internal conduits. The internal conduits are configured to be placed in fluid communication with the supply of heat transfer fluid, e.g., when the battery pack is ultimately connected to the supply in a vehicle, power plant, or other system.

The bus bar assemblies, which are provided in a number equal to the number of battery modules, i.e., one bus bar assembly per battery module, are connected to the external longitudinal surfaces. Each respective bus bar assembly engages or mates with the voltage terminals of a respective one of the battery modules. The internal conduits extend along a length of the elongated backplane body adjacent to the bus bar assemblies such that the heat transfer fluid is conducted to and from the bus bar assemblies via the internal conduits.

The battery pack may include end plates mounted to a respective end surface of the battery modules. The end plates include negative and positive electrical terminals configured to mate with a corresponding connector of a respective one of the bus bar assemblies, with terminal-to-connection engagement achieved by pushing the electrical connectors into or onto the respective voltage terminals.

The positive voltage terminals of each of the battery modules are enclosed in or protected by a "finger-proof" barrier defined by a respective one of the bus bar assemblies and the end plates, respectively. The negative and positive electrical terminals may be optionally configured as an exposed bar or male terminal and a U-shaped receptacle or female terminal, respectively.

The bus bar assemblies may be over-molded to the external longitudinal surfaces of the backplane body in some embodiments, or connected thereto using electrical tape, adhesive, or other joining structure as part of a secondary operation.

The battery pack may include cooling plates in fluid communication with the internal conduits, with such plates disposed adjacent to the battery modules and configured to direct/conduct heat transfer fluid into and out of the conduits.

The conduits may include parallel and adjacent first and second conduits, with the first conduit carrying the heat transfer fluid at a first temperature into the battery modules, individually, i.e., not in series. The second conduit carries the heat transfer fluid at a second temperature out the respective battery modules, with the second temperature being higher than the first temperature.

The internal conduits according to another embodiment include three conduits, including first and second conduits running adjacent to the external longitudinal surfaces and a third conduit extending between and parallel to the first and second conduits. The first and second conduits conduct the heat transfer fluid at a substantially equal temperature, while the third conduit is configured to conduct the heat transfer fluid at a temperature that is substantially higher or lower than the substantially equal temperatures.

The backplane body may be non-linear in some embodiments, such that a flow path through the conduits is non-linear along a length of the backplane body. The flow path may be straight or linear in other embodiments.

A backplane assembly is also disclosed for use with the above-noted battery pack, i.e., having battery modules that are arranged in one or more rows, each having positive and negative voltage terminals oriented between the rows, and each being in fluid communication with a supply of heat transfer fluid. The backplane assembly includes an elongated backplane body with external longitudinal surfaces. The backplane body defines internal conduits configured to conduct heat transfer fluid from the supply of heat transfer fluid, with the conduits extending along a length of the elongated backplane body. The number of bus bar assemblies equals the number of battery modules, with each bus bar assembly being connected to the external longitudinal surfaces of the elongated backplane body. The bus bar assemblies are configured to connect to the positive and negative voltage terminals of the battery modules. The internal conduits direct the heat transfer fluid to and from the bus bar assemblies to cool or heat the bus bar assemblies.

A vehicle is also disclosed herein that includes drive wheels powered via motor torque, an electric machine configured to generate the motor torque, a supply of heat transfer fluid, and a battery pack. The battery pack, which is electrically connected to the electric machine and is fluidly connected to the supply of heat transfer fluid, includes a plurality of battery modules and the above-described backplane assembly. The modules are arranged in one or more rows, and each battery module has positive and negative voltage terminals and an end plate. The end plate partially covers the positive voltage terminal to form a finger-proof barrier between an operator and a high-voltage bus of the vehicle.

The above features and advantages and other features and advantages will be readily apparent from the following detailed description when taken in connection with the accompanying drawings.

DETAILED DESCRIPTION

Figure 1:
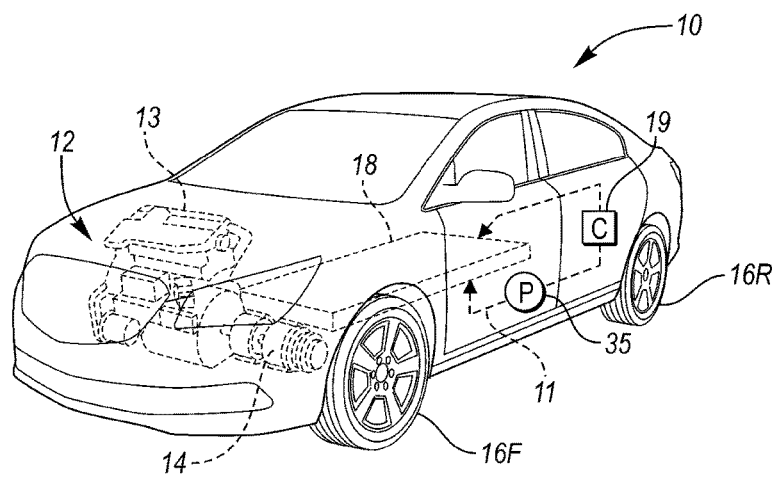
FIG. 1 is a schematic perspective view illustration of an example motor vehicle having a battery pack containing multiple battery modules, with the battery modules constructed according to the present disclosure.

Referring to the drawings, wherein like reference numbers refer to like components throughout the several views, a motor vehicle 10 is shown in FIG. 1 having a powertrain 12 that includes a high-voltage battery pack 18. As described below with reference to FIGS. 2-6, the battery pack 18 described herein utilizes a backplane assembly 30 that integrates or combines bus bar connectivity of the battery pack 18 with thermal regulation, i.e., cooling or heating, of individual bus bar assemblies used for this purpose. The battery pack 18 may have a relatively flat, generally rectangular shape as shown, or the battery pack 18 may be arranged in a T-configuration or other application-suitable shape. The powertrain 12 may include an internal combustion engine 13 and one or more electric machines 14 in a hybrid electric embodiment, or may forego use of the engine 13 in a battery electric embodiment energized solely via the battery pack 18.

In both embodiments, the powertrain 12 transmits torque generated by the engine 13 and/or the electric machine(s) 14 to a set of front drive wheels 16F and/or rear drive wheels 16R, or motor torque from the electric machine 14 may be used solely to crank and start the engine 13. While the motor vehicle 10 is described hereinafter as an example system benefiting from the battery pack 18 as configured according to the present disclosure, the battery pack 18 may be readily adapted for use in marine vessels, aircraft, rail vehicles, robots, and mobile platforms, as well as in power plants and other stationary systems.

The battery pack 18 may use a lithium-ion, nickel-metal hydride, or other application-suitable battery chemistry. By way of example and not limitation, the battery pack 18 may include foil pouch-type or plate-style battery cells (not shown) arranged in a stack and serially connected to provide output power sufficient for energizing the electric machine 14. When the electric machine 14 is embodied as a traction motor for rotating the drive wheels 16F and/or 16R and propelling the motor vehicle 10, for instance, the battery pack 18 may arrange such battery cells in separate battery modules 20 as shown schematically in FIG. 2 so as to produce a direct current (DC) output voltage of 60-300 volts (VDC) or more.

Figure 2:
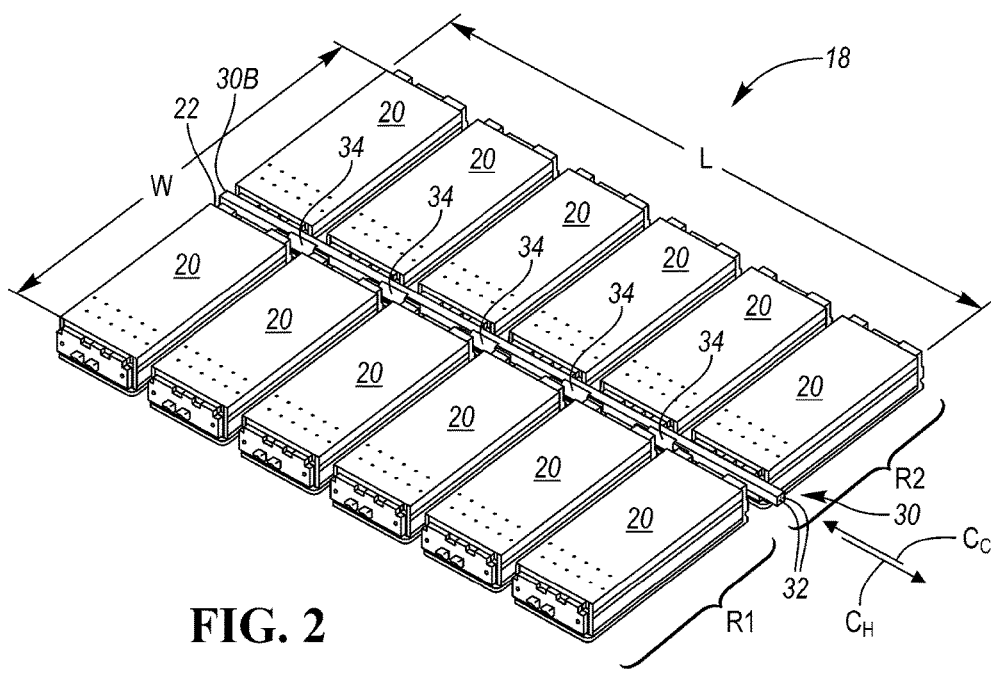
FIG. 2 is a schematic perspective view illustration of an example battery pack usable as part of the motor vehicle shown in FIG. 1.

In order to achieve a relatively high output voltage, the battery modules 20 may be arranged in a particular geometric configuration, such as the flat configuration of FIGS. 1 and 2, and serially connected using a high-voltage bus. This in turn connects the individual battery modules 20 to power electronics and a thermal management system. The thermal management system is shown schematically to include a fluid pump (P) configured to circulate heat transfer fluid (arrow 11) to and from the battery pack 18, with warmer or colder heat transfer fluid passing out of the battery pack 18 through a chiller (C) 19 to help regulate a temperature of the battery pack 18. Other components of the thermal management system are omitted for illustrative simplicity, including directional and thermal expansion valves, thermostats, radiators, heat exchangers, etc. Additionally, while associated power electronics are omitted from FIG. 1 for illustrative simplicity, such components typically include a power inverter module using pulse width modulation (PWM)-controlled semiconductor switches to invert a DC voltage from the battery pack 18 into an alternating current voltage (VAC) for powering the electric machine 14, a DC-DC converter or auxiliary power module for reducing the voltage level from the battery pack 18 to auxiliary (e.g., 12-15 VDC) levels sufficient for powering auxiliary electrical systems aboard the vehicle 10.

Figure 4A:
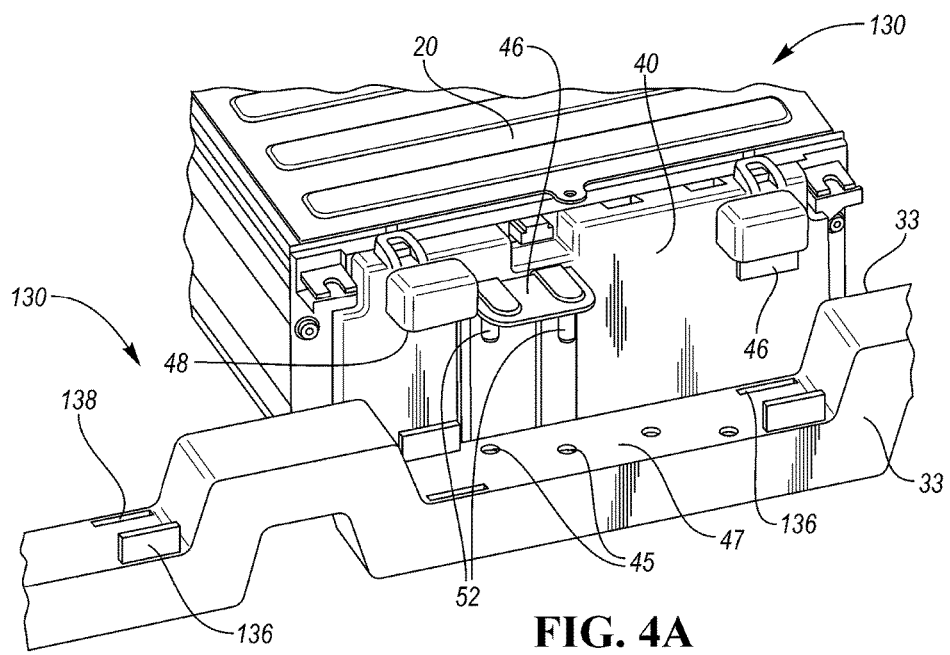
FIGS. 4A and 4B are schematic perspective view illustrations of a portion of one of the battery modules of FIG. 3 depicting a possible assembly option within the scope of the disclosure.
Figure 4B:
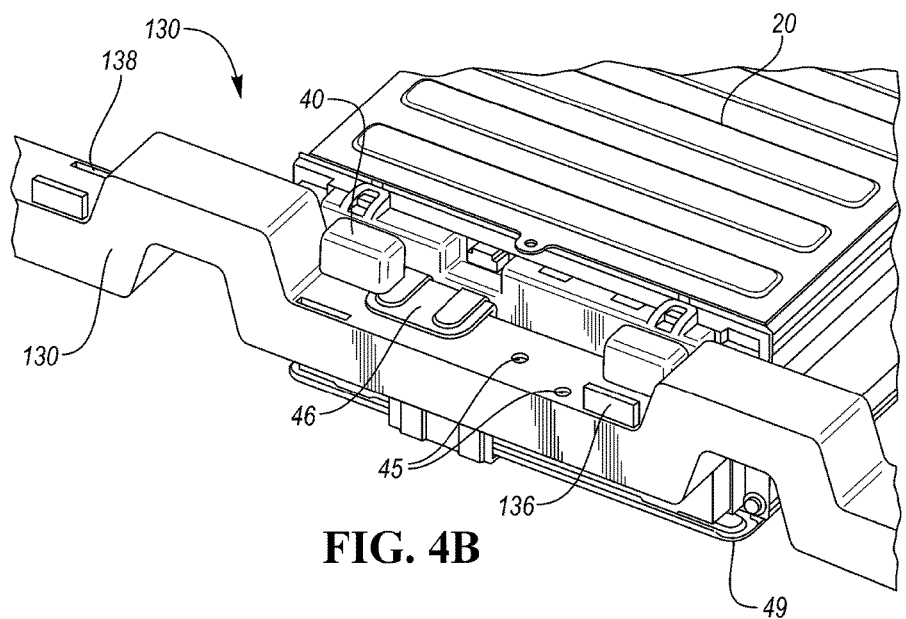

FIG. 2 depicts a rectangular configuration of the battery pack 18 as described generally above with reference to FIG. 1. In this non-limiting example embodiment, a plurality of battery modules 20, each having an end surface 22, are arranged end-to-end in parallel rows R1 and R2, although only one row R1 may be present in other embodiments. The battery pack 18 has a width (W) and a length (L), with each row R1 and R2 extending along the length (L). Additional rows could be added to increase the width (W), with an even number of rows being contemplated in the disclosed embodiments, although not required. As part of the battery pack 18, a backplane assembly 30 having an elongated backplane body 30B is positioned between the parallel rows R1 and R2. The backplane body 30B, which may be constructed from injection-molded plastic in some embodiments, may be straight/linear and parallel to the rows R1 and R2 along the length (L). However, the shape of the backplane body 30B ultimately depends on the geometry of the battery modules 20 and the battery pack 18, and thus the straight/linear configuration of FIG. 2 is just one possible geometric layout suitable for the flat rectangular battery pack 18, with FIGS. 4A and 4B depicting alternative non-linear shapes.

In addition to supporting the bus bar assemblies 34, the backplane body 30B defines a plurality of internal conduits 32 in fluid communication with an external supply of heat transfer fluid, e.g., the pump 35 shown in FIG. 1, such that heat transfer fluid 11 of FIG. 1 is conducted respectively to and from the battery packs 18 via the backplane assembly 30. The conduits 32 may conduct heat transfer fluid at a lower temperature, as indicated by arrow $C_C$, to the bus bar assemblies 34 where heat is extracted and conducted to a heat exchanger or chiller (see FIG. 1) as warmer heat transfer fluid (arrow $C_H$), e.g., in a closed thermal management loop. In this manner, the backplane assembly 30 combines bus bar electrical connectivity with thermal management of the bus bar assemblies 34.

Figure 3:
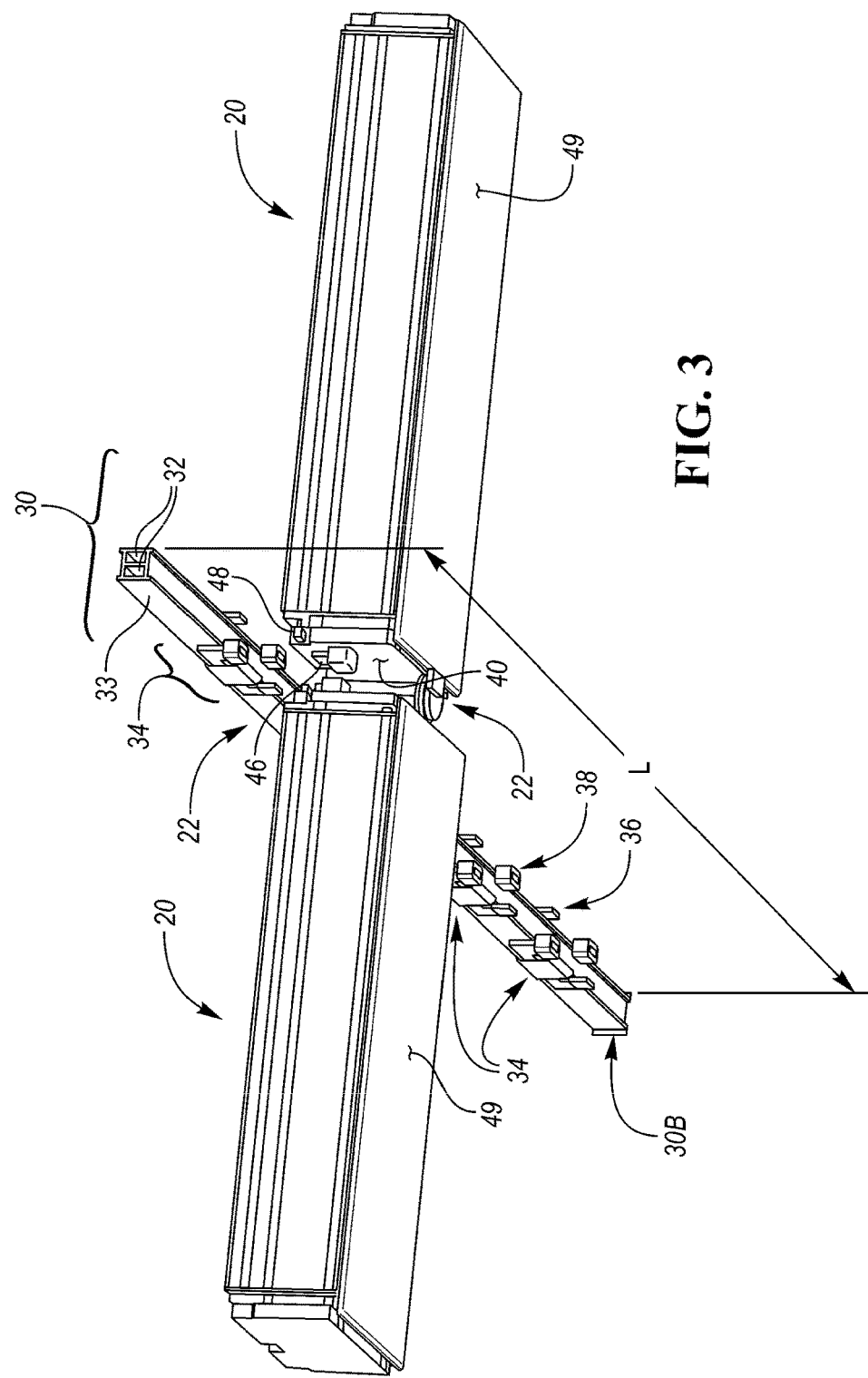
FIG. 3 is a schematic perspective view illustration of a pair of battery modules connected via a backplane according to the present disclosure.

Referring to FIG. 3, a perspective side-view illustration of a pair of the battery modules 20 depicts an end-view of the backplane assembly 30. As shown, the bus bar assemblies 34 are connected to external longitudinal surfaces 33 of the backplane assembly 30 and spaced evenly along the length (L) of the backplane assembly 30. In the illustrated embodiment, a parallel adjacent pair of the conduits 32 is used to conduct heat transfer fluid to and from the battery modules 20. Heat transfer fluid may flow through a plate 49 disposed adjacent to and below the battery module 20. In an example cooling operation, relatively cold heat transfer fluid (arrow $C_C$ of FIG. 2) may flow into the battery modules 20, individually, through a designated one of the conduits 32, circulate within the battery modules 20 by way of tubing, fins, etc., as is known in the art, and exit at an elevated temperature to the other conduit 32, as indicated by arrow $C_H$.

As described in more detail below, an end plate 40 may be mounted to a respective end surface 22 of a respective battery module 20. The end plates 40 include negative and positive voltage terminals 46 and 48 configured to mate with corresponding electrical connectors 36 and 38 of the backplane assembly 30, specifically using a push-to-connect process that is characterized by an absence of the use of fasteners. The positive voltage terminal 48 may be enclosed in or covered by a finger-proof barrier molded into the material of the end plate 40. Mating engagement of the backplane assembly 30 and the battery modules 20 occurs by pushing the backplane assembly 30 onto the battery module 20, or vice versa, in a "push-to-connect" manner without requiring an operator to access the positive voltage terminal 48 of the battery module 20, e.g., in order to install a fastener between the battery module 20 and an exposed bus bar.

FIGS. 4A and 4B depict a possible installation of the battery module 20 to a backplane 130, with the backplane 130 differing from the backplane 30 of FIGS. 2 and 3 in its geometry. That is, while a perfectly straight or linear configuration may be desirable for the purposes of simplicity of manufacturing, the battery pack 18 of FIG. 1 may not have such symmetry. Beams, power components, housing structure, or other intervening structure may require the geometrical shape of the backplane 130 to be modified, with one possible geometric modification shown in FIGS. 4A and 4B.

FIG. 4A depicts the backplane 130 as fixed in place, e.g., in a battery tray (not shown), with a battery module 20 lowered toward the backplane 130. Near the longitudinal surface 33 of the backplane 130 facing the battery module 20, the backplane 130 includes or defines electrical connectors 136 and 138. The end plate 40 covers and supports the positive voltage terminal 48 of the battery module 20, with the terminals 48 and 46 being electrically connected on the non-exposed/opposite side of the end plate 40 to the various battery cells. The positive voltage terminals 48 may be optionally embodied as recessed/U-shaped female connectors largely covered by the end plate 40 as shown, while the negative voltage terminal 46 may be a tab extension/male connector extending parallel to the end surface 22 of the battery module 20 toward the mating electrical connector 136.

Figure 5:
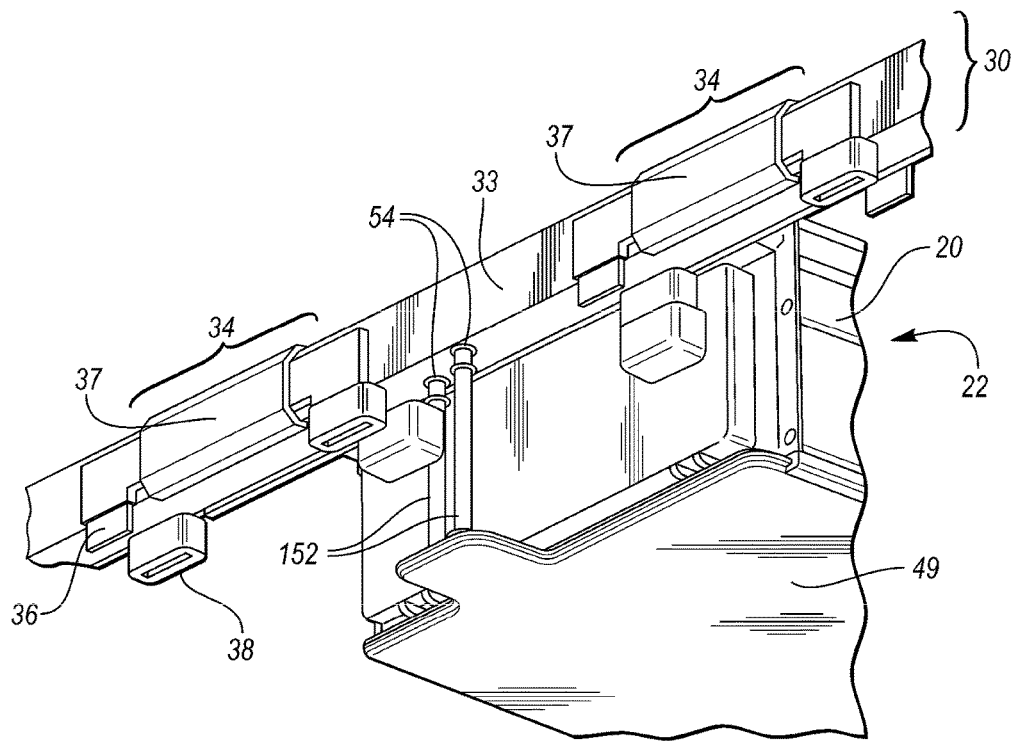
FIG. 5 is a schematic perspective view illustration of an installed backplane depicting an end surface and an optional end plate of the battery modules shown in FIG. 3.

Also visible from the perspective of FIGS. 4A and 4B are holes 45 defined by and extending through a lateral surface 47 of the backplane 130, i.e., extending between the longitudinal surfaces 33. Such holes 45 may be connected to the battery modules 20, possibly via the plate 49, using suitable lengths of tubing 52 or 152 as best shown in FIGS. 4A and 5, respectively. Thus, the battery module 20 is easily pressed onto the backplane 130 as best shown in FIG. 4B such that the electrical connectors 136 and 138 of the backplane 130 are pushed into or onto the mating voltage terminals 46 and 48 of the battery module 20.

Referring to FIG. 5, the end surface 22 of a given one of the battery modules 20 is shown as it might appear upon a successful connection to the backplane 30. The bus bar assemblies 34 surrounding the battery module 20 are ultimately connected to another corresponding battery module 20 to complete assembly of the battery pack 18 of FIGS. 1 and 2. Tubing 152 fluidly connects to openings 54 in the backplane 30 to thereby connect the plate 49 to the backplane 30. The bus bar assemblies 34 are mounted to the longitudinal surfaces 33 of the backplane 30, such as via a secondary operation using electrical tape or other suitable mounting structure 37, or by over-molding the bus bar assemblies 34 onto the longitudinal surfaces 33. Over-molding is a manufacturing process in which a part is progressively molded from different materials, e.g., the longitudinal surfaces 33 and bus bar assemblies 34 may be partially or fully covered by over-mold materials to securely attach the bus bar assemblies 34. As the backplane 30 also defines the conduit 32 of FIG. 3, heat transfer fluid ultimately passes in close proximity to the bus bar assemblies 34 to help regulate the temperature of the bus bar assemblies 34.

Figure 6:
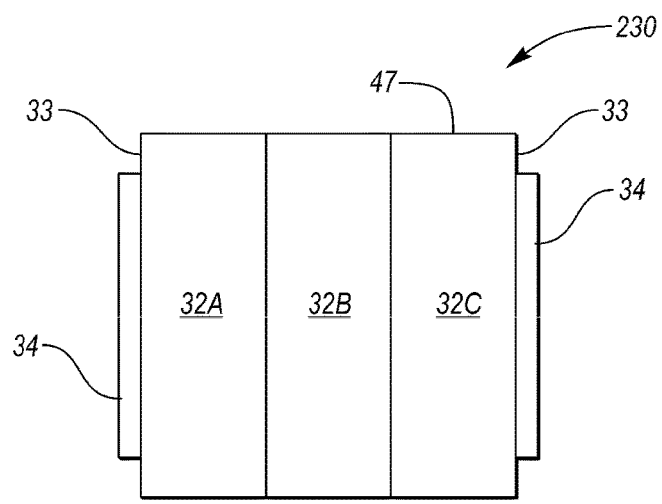
FIG. 6 is a schematic end view illustration of an optional embodiment of the backplane shown in FIGS. 2-5.

FIG. 6 depicts a schematic end view of a backplane 230 according to an alternative embodiment. The backplane 230 defines three parallel and adjacent internal conduits 32A, 32B, and 32C, with the conduit 32B flanked by the conduits 32A and 32C. The bus bar assemblies 34 are connected to the longitudinal surfaces 33, i.e., mounted to the longitudinal surfaces as in FIGS. 2, 3, and 5 or over-molded to the longitudinal surfaces 33 as in FIGS. 4A and 4B. In the example embodiment of FIG. 6, heat transfer fluid may flow in two different ways: into the battery modules 20 at a relatively low temperature via the innermost conduit, i.e., the conduit 32B, and return from the battery modules 20 at a relatively high temperature through the outermost conduits 32A and 32C, or heat transfer fluid in conduit 32B may be at a lower temperature relative to the outermost conduits 32A and 32C.

It may be advantageous to prioritize cooling of the battery cells within the battery modules 20 as opposed to cooling the bus bar assemblies 34, or vice versa depending on the configuration of the battery pack 18. Therefore, routing of the heat transfer fluid through the battery pack 18, including through the battery modules 20 and the backplane 230, may be modified based on the application, such that components having a higher cooling priority are supplied with heat transfer fluid at a lower temperature. In other words, warmer heat transfer fluid flowing through the conduits 32A and 32C relative to conduit 32B may still be cooler than the bus bar assemblies 34, with a temperature difference between a given bus bar assembly 34 and heat transfer fluid temperature in the adjacent conduit 32A or 32C potentially providing ample cooling of the bus bar assemblies 34.

The backplanes 30, 130, and 230 described above enable integration of electrical backplane and thermal regulation structure of the battery pack 18 of FIG. 1 into one structural element. Corresponding male/female interfaces ensure that high-voltage is not present on exposed bus bars of the bus bar assemblies 34 before, during, or after installation of the battery modules 20 into the battery pack 18. The configurations described herein may also reduce part count and minimize leak paths relative to existing electrical and thermal management structures. Improved thermal regulation of the bus bar assemblies 34 via the backplanes 30, 130, or 230 potentially reduces the size of the bus bar assemblies 34. In terms of manufacturing options, when using a linear flow path as shown in FIGS. 2 and 3, the two conduits 32 of the corresponding backplane 30 can be extruded, with the bus bar assemblies 34 attached to the backplane 30 as a secondary operation. When the flow path is nonlinear, the backplane 130 or 230 can be injection-molded with the bus bar assemblies 34 thereafter over-molded or attached in a secondary operation. The holes 45 shown in FIGS. 4A and 4B may likewise be introduced in a secondary operation or as part of the injection molding of the backplane 130 or 230.

The design of the battery pack 18 ultimately dictates the optimal assembly sequence. For instance, if the battery modules 20 are first arranged in a battery tray (not shown), the backplane 30, 130, or 230 may be lowered toward and connected to the battery modules 20 and the conduits 32. Alternatively, the backplanes 30, 130, or 230 may be installed to the battery modules 20 in a first step prior to installation within the battery pack 18.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A battery pack for use with a supply of heat transfer fluid, the battery pack comprising:
 a plurality of battery modules arranged in a row, wherein each respective battery module of the plurality of battery modules has a respective positive and negative voltage terminal; and
 a backplane assembly connected to the plurality of battery modules, and including:
  an elongated backplane body having external longitudinal surfaces, wherein the elongated backplane body is parallel to the row and defines two or more internal conduits; and
  a plurality of bus bar assemblies, equal in number to the plurality of battery modules and connected to the external longitudinal surfaces, each respective one of the bus bar assemblies being configured to mate with a corresponding one of the positive or negative voltage terminals of a respective one of the battery modules;
 wherein the conduits extend along a length of the elongated backplane body adjacent to the bus bar assemblies such that heat transfer fluid from the supply is conducted to and from the bus bar assemblies through the conduits.

2. The battery pack of claim 1, further comprising: a plurality of end plates, each of which is mounted to a respective battery module of the plurality of battery modules, wherein the positive voltage terminals are partially covered by a respective one of the end plates such that the end plates define a finger-proof barrier.

3. The battery pack of claim 2, wherein an electrical connection between a respective one of the bus bar assemblies and the positive and negative voltage terminals of a respective one of the battery modules is established solely via a push-to-connect operation.

4. The battery pack of claim 3, wherein the finger-proof barrier is a U-shaped receptacle molded into a respective one of the end plates.

5. The battery pack of claim 1, wherein the bus bar assemblies are over-molded onto the external longitudinal surfaces of the backplane body.

6. The battery pack of claim 1, further comprising: at least one plate in fluid communication with the internal conduits, wherein the at least one plate is disposed adjacent to the battery modules and is configured to direct the heat transfer fluid into and out of the internal conduits.

7. The battery pack of claim 1, wherein the internal conduits include parallel first and second conduits, with the first conduit carrying the heat transfer fluid at a first temperature into the plurality of battery modules, individually, and the second conduit carrying the heat transfer fluid at a second temperature out of the respective battery modules, the second temperature being higher or lower than the first temperature.

8. The battery pack of claim 1, wherein the internal conduits include parallel first and second conduits running adjacent to the external longitudinal surfaces and a third conduit extending between and parallel to the first and second conduits, wherein the first and second conduits are configured to conduct the heat transfer fluid at substantially equal temperatures and the third conduit is configured to conduct the heat transfer fluid at a temperature that is substantially higher or lower than the substantially equal temperatures.

9. The battery pack of claim 1, wherein the elongated backplane body is non-linear such that a flow path of the heat transfer fluid through the conduits is non-linear along a length of the elongated backplane.

10. The battery pack of claim 1, wherein the elongated backplane body is linear such that a flow path of the heat transfer fluid through the conduits is linear along a length of the elongated backplane.

11. A backplane for use with a battery pack having a plurality of battery modules arranged in one or more rows, each of the battery modules having positive and negative voltage terminals oriented between the one or more rows, and each of the battery modules being in fluid communication with a supply of heat transfer fluid, the backplane comprising:
- an elongated backplane body arranged parallel to the one or more rows, and having external longitudinal surfaces and defining a plurality of internal conduits configured to conduct heat transfer fluid from the supply, the plurality of internal conduits extending along a length of the elongated backplane body; and
- a plurality of bus bar assemblies in a number equal to the plurality of battery modules and connected to the external longitudinal surfaces of the elongated backplane body;
- wherein the bus bar assemblies are configured to connect to the positive and negative voltage terminals of the battery modules, and wherein the internal conduits are configured to direct the heat transfer fluid to and from the bus bar assemblies to regulate a temperature of the bus bar assemblies.

12. The backplane of claim 11, wherein each of a plurality of end plates is mounted to a respective one of the battery modules, with the end plates including the positive and negative voltage terminals, and wherein the bus bar assemblies include electrical connectors that are configured to mate with a corresponding one of the voltage terminals in a push-to-connect manner without the use of fasteners.

13. The backplane of claim 11, wherein the bus bar assemblies are over-molded onto the external longitudinal surfaces of the elongated backplane body.

14. The backplane of claim 11, further comprising: a plurality of tubes connected to the elongated backplane body, the plurality of tubes fluidly connecting the internal conduits to the battery modules.

15. The backplane of claim 11, wherein the internal conduits include only two parallel conduits.

16. The backplane of claim 11, wherein the internal conduits include three parallel conduits.

17. The backplane of claim 11, wherein the elongated backplane body is linear such that a flow path of the heat transfer fluid through the conduits is linear along a length of the elongated backplane.

18. The backplane of claim 11, wherein the elongated backplane body is non-linear such that a flow path of the heat transfer fluid through the conduits is non-linear along a length of the elongated backplane.

19. A vehicle comprising:
- a set of drive wheels powered via motor torque;
- an electric machine configured to generate the motor torque;
- a supply of heat transfer fluid; and
- a battery pack electrically connected to the electric machine and fluidly connected to the supply of heat transfer fluid, the battery pack including:
  - a plurality of battery modules arranged in one or more rows, each battery module having positive and negative voltage terminals and an end plate partially covering the positive voltage terminal to form a finger-proof barrier between an operator and a high-voltage bus of the vehicle; and
  - a backplane assembly positioned parallel to the one or more rows, the backplane assembly having:
    - an elongated backplane body having external longitudinal surfaces, and defining a plurality of internal conduits in fluid communication with the supply of heat transfer fluid; and
    - a plurality of bus bar assemblies equal in number to the plurality of battery modules and connected to the external longitudinal surfaces, each respective one of the bus bar assemblies being configured to mate with the voltage terminals of a respective one of the battery modules;
  - wherein the conduits extend along a length of the elongated backplane body adjacent to the bus bar assemblies such that the heat transfer fluid is conducted to and from the bus bar assemblies via the conduits.

* * * * *